No. 723,728. PATENTED MAR. 24, 1903.
W. P. POWERS.
TEMPERATURE REGULATING APPARATUS.
APPLICATION FILED MAR. 14, 1898.
NO MODEL. 3 SHEETS—SHEET 1.
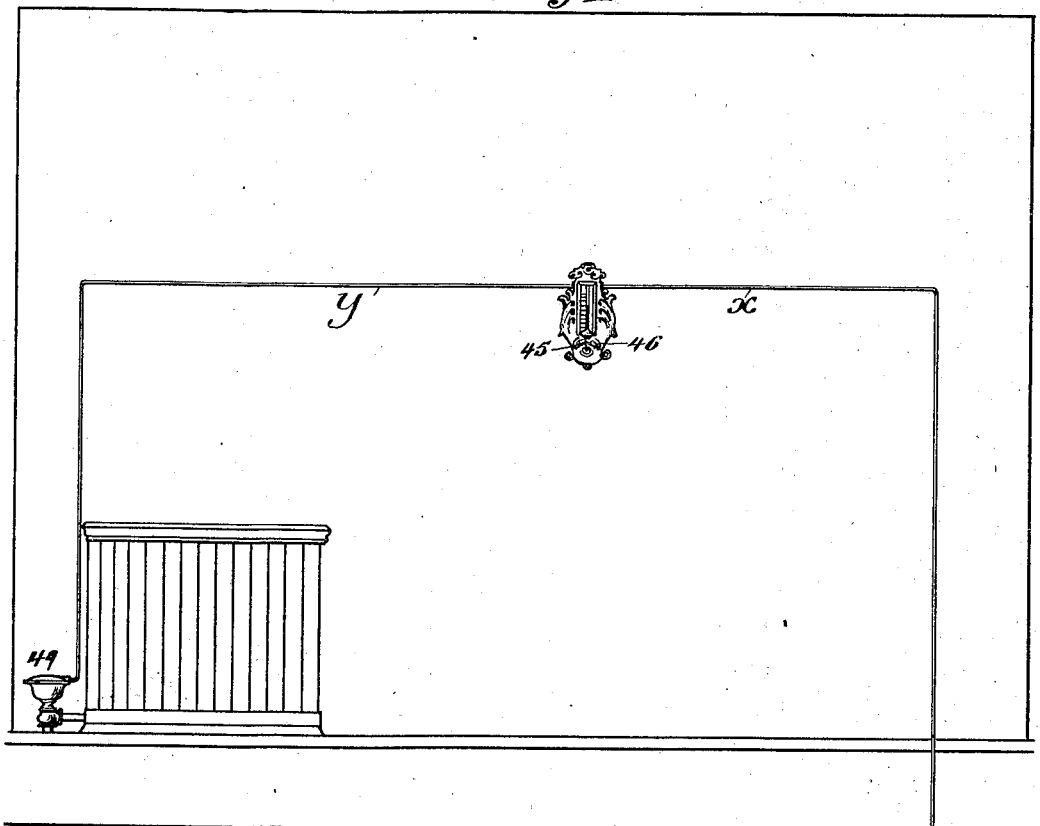
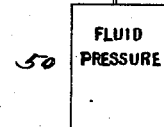
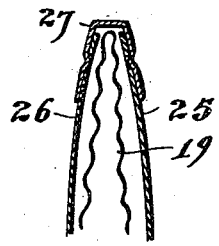
Witnesses,
J. J. Mann,
Frederick J. Goodwin
Inventor,
William P. Powers,
By Offield, Towle & Linthicum,
Attys.

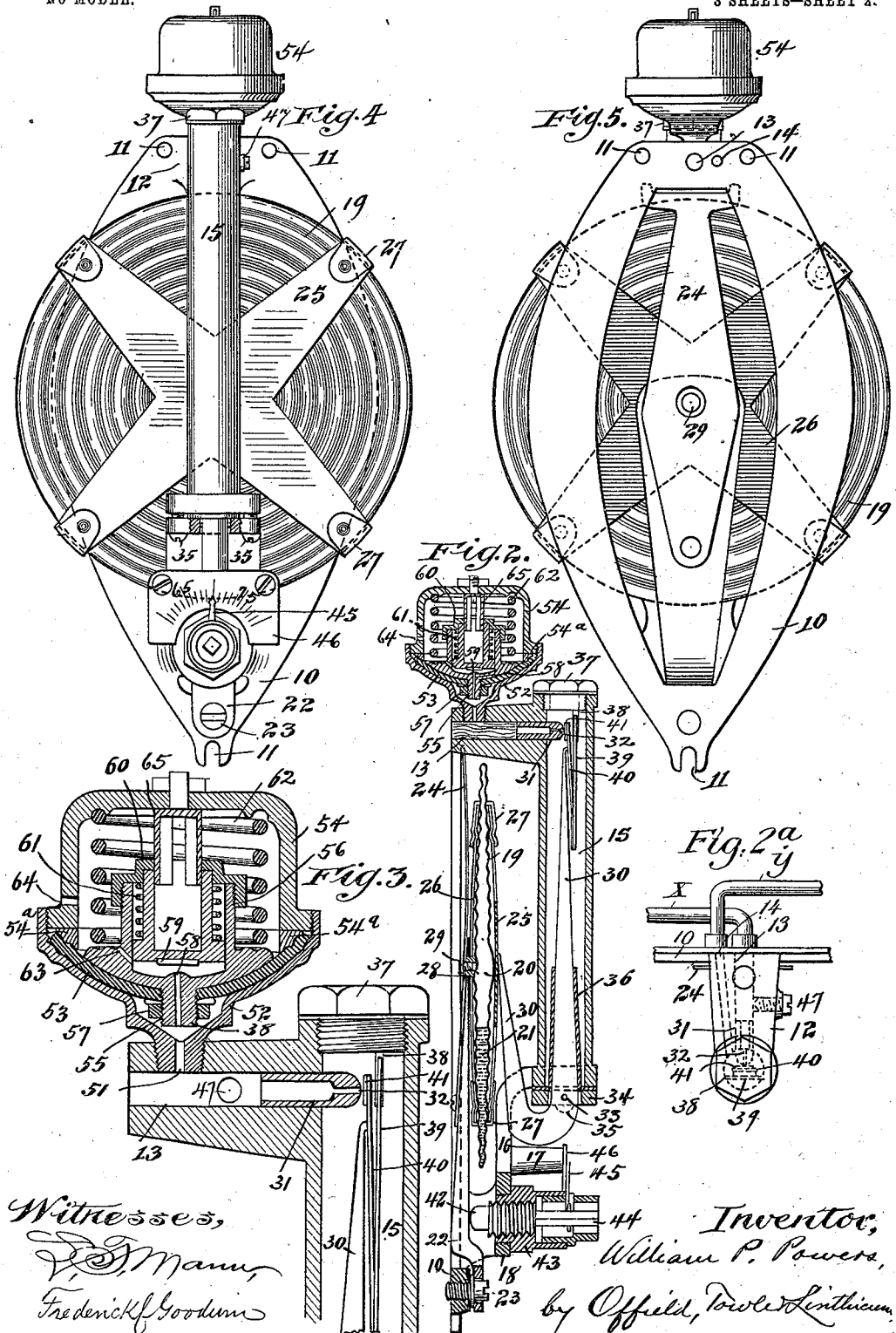

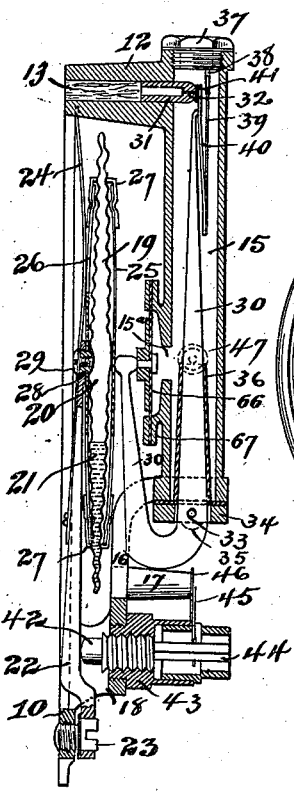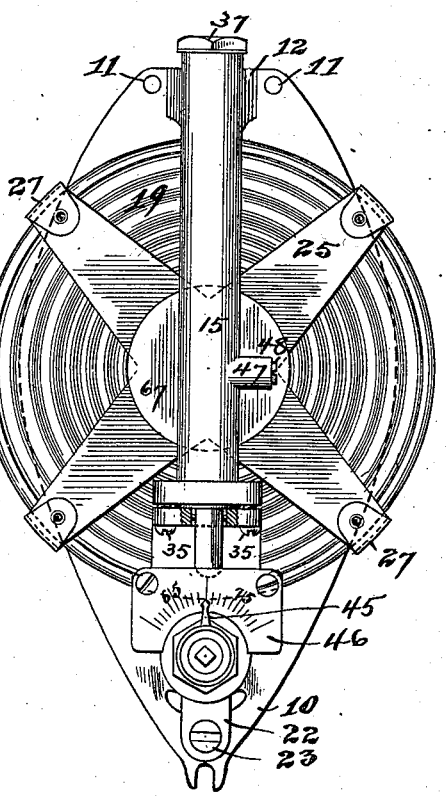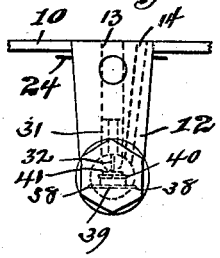

UNITED STATES PATENT OFFICE.

WILLIAM P. POWERS, OF CHICAGO, ILLINOIS.

TEMPERATURE-REGULATING APPARATUS.

SPECIFICATION forming part of Letters Patent No. 723,728, dated March 24, 1903.

Application filed March 14, 1898. Serial No. 673,765. (No model.)

*To all whom it may concern:*

Be it known that I, WILLIAM P. POWERS, of Chicago, in the county of Cook and State of Illinois, have invented certain new and useful Improvements in Temperature-Regulating Apparatus, of which the following is a specification.

This invention relates to certain improvements in temperature-regulating apparatus, and more particularly to certain improvements in the thermostat thereof.

The thermostat of this application belongs to that class known as "fluid-pressure" thermostats—that is to say, an expansible chamber or vessel, usually of flat oval form, containing a liquid vaporizing at low temperature, such vaporization operating to move one or both walls of the vessel, and thereby impart through suitable instrumentalities a movement to some element of the heat-regulating apparatus. As most generally applied, the movement of the wall of the vessel containing the volatile liquid is made to open a valve controlling a port or passage, through which a motor fluid is permitted to pass to a motor, which in turn operates to move a valve or damper governing the flow of a heating medium.

The thermostatic device which is shown in this application is capable of being used for other purposes than regulating temperature; but a description thereof with relation to that purpose will be sufficient to indicate the principle of operation.

In the accompanying drawings, Figure 1 is a diagrammatic view showing the application of my invention as a part of a temperature-controlling apparatus. Fig. 2 is a sectional elevation of one form of the thermostat designed for controlling steam-valves. Fig. 2ª is a plan view of the upper end of the tubular member and lug of the thermostat shown in Fig. 2, showing the air ports or passages. Fig. 3 is an enlarged sectional elevation of the upper end of the thermostat shown in Fig. 2, and Figs. 4 and 5 are respectively front and rear elevations thereof. Fig. 6 is a detail view showing the construction of the expansible chamber. Figs. 7, 8, and 9 show a modified form of the invention, Fig. 7 being a front elevation, Fig. 8 a sectional elevation, and Fig. 9 a plan view of the upper end of the thermostat, showing the ports or passages in the lug.

In use the thermostat is secured to a wall-plate having air-passages therein registering with those of the thermostat, and an ornamental cover usually provided with a thermometer is secured over the thermostat. In the drawings, Figs. 2 to 9, inclusive, the wall-plate and cover are omitted and only the functional parts of the apparatus are shown.

The two forms of thermostat are alike, except that the one shown in Figs. 2 to 5, inclusive, is provided with a valved air-escape and a motor for automatically controlling said escape, while in the thermostat of Figs. 7, 8, and 9 the air-escape and its motor are omitted and a second diaphragm is employed.

Let 10 represent a frame-plate of any convenient form, which is provided with screw-holes at 11 for securing it to a wall-plate. For convenience also the upper end of said plate has an angular lug or offset 12, drilled to provide two passages 13 and 14, both of which lead into the interior of a pipe 15, formed integrally with the lug 12 and plate 10 and having at its lower end the arms 16 and the standards 17, connected by a web 18 with the lower end of the plate 10. The passage 13 may be filled with a suitable air-filtering material, such as wicking or waste, as indicated in Figs. 2 and 8. The tubular member or pipe 15 may be parallel to the plate 10, and between them is afforded space for the introduction of the expansible chamber or vessel 19, popularly called a "disk" and which is composed of two sheets of corrugated metal joined at their edges and providing between them a liquid-chamber 20 to contain a volatile liquid, as shown at 21. This disk or vessel is carried by a lever 22, supported at one end upon a screw 23, threaded into the lower end of the plate 10. The lever 22 has secured thereto a leaf-spring 24, whose upper end is bifurcated to embrace the lug 12, as seen in Fig. 5. The vessel 19 is held between the spring-clamps 25 and 26, preferably of sheet-steel and of spider form. The outer ends of the arms of these clamps are joined by the clips 27, held to the arms by projecting points thereon, which enter small apertures or countersunk depressions in the ends of the arms, as shown in the detail view, Fig. 6. The clamps 25 and 26, with their clips 27, constitute a reinforcing-frame for the disk or expansible chamber. The disk may be made out of thin metal and the clamps of a stronger material and serving to reinforce or support the thin walls of the disk, while the form of clips used afford a convenient means for connecting the extremities of the clamps, while permitting them to expand and contract with the disk. The clamp 26 carries a threaded nut 28, which receives a screw 29, which passes through the end of the lever 22 and the end of the spring 24, thus bodily securing the vessel 19 with the lever and spring. Upon the opposite side of the vessel and in close proximity to its clamp 25 is one end of a U-shaped lever 30, the opposite end of which is introduced into the bore of the pipe 15 and extends therethrough nearly the full length of the passage, terminating a little short of a hollow plug 31, having a minute orifice 32 therein and forming at its outer end a valve-seat. The lever 30 is fulcrumed or pivoted at 33 to a clamping-ring 34, the latter being held by screws 35 to the pipe 15. In order to form an air-tight joint or seal, which will prevent the escape of the fluid under pressure in the pipe around the bent lever 30 and yet permit the free movement of the latter upon its fulcrum, a flexible packing in the form of a tube 36 is drawn over the lever 30 and having at one end a flange clamped between the ring 34 and the end of the pipe 15. As will be seen, the packing is flexed when the lever moves; but the fulcrum of the lever is so near the joint formed by the packing that only a very slight flexion or bending of the packing takes place. The upper end of the tube 15 is closed by the screw-plug 37, and the internal wall of the tube 15 is provided with slots 38, as shown in Figs. 2ᵃ and 9, to receive a plate 39, to which is attached at one end a spring-plate 40, carrying the valve 41. The spring-plate 40 contacts with the end of the lever 30, which is slightly upturned. Assuming now that the liquid in the vessel 20 expands by reason of a rise in temperature, the walls of said vessel will distend or separate, thus transmitting motion to the arm of the lever 30, rocking said lever upon its pivot and in turn moving the valve 41 away from its seat. Upon a fall of temperature the walls of the vessel will contract, and the spring-plate 40 will return the valve to its seat.

It is found desirable to provide adjustments for the apparatus, and to this end the screw 23 affords the primary means of adjustment and is to be used in setting up the thermostat. A further means of adjustment is shown in the threaded plug 42, working in the threaded sleeve 43 and having a spindle 44, carrying a pointer 45, whose end moves over the scale marked on the plate 46. The scale is marked to correspond with degrees of heat, and by turning the spindle the pointer may be set to any desired degree, and the device will operate when the temperature of the apartment containing the thermostat approximates that point. A permanent waste is provided in a boss 47, having a screw 48 to control the escape-opening. This waste is in the return-passage leading from the valve 32, and in the form of construction shown in Figs. 2 to 5, inclusive, it is provided in the lug 12 and leads from the passage 13, while in the form of construction shown in Figs. 7, 8, and 9 it is located in the tube 15.

I will now describe the operation of the thermostat shown in Figs. 2 to 5, inclusive, assuming that the passage 13 is connected by pipe X with a motor 49 and that the passage 14 is connected by pipe Y with a reservoir 50 of compressed air and that the valve 41 is closed. If, then, the thermostat acts so as to open the valve, air would enter the valve-chamber through the passage 14 and flow through the passage 13 into the motor 49 above its diaphragm. Obviously if this motor was connected to and designed to operate a steam-valve and the rise of temperature was very slow it would take a considerable time for sufficient pressure to accumulate in the motor to close the valve, or, in other words, the action upon the valve would be slow and gradual, which is objectionable. To secure a more prompt and effectual closing of the valve, as is desirable, a second escape-opening is provided at some point between the air-controlling valve and the main motor 49, and a second motor is provided which controls this escape. This second motor is so arranged that it will permit the escape of air until the valve 41 has opened sufficiently to admit air in such volume as to effectually operate, through the motor, to close the main valve. For convenience this air-escape is formed in the lug containing the passage 13, and the second motor is attached to and mounted upon said lug. The escape-aperture is marked 51, and the motor-base comprises the plate 52, terminating in a threaded boss, which contains the passage 51 and forms a portion of the motor-chamber. A diaphragm 53 is clamped to said plate by means of the threaded cap 54 and washer 54ᵃ. The diaphragm is perforated at its center to receive a threaded boss 55 on a cup 56, and the usual nut 57 holds the cup and diaphragm in proper relation. An aperture 58 is provided in line with the aperture 51 through this threaded boss and the bottom of the cup, and the bottom of the cup forms a valve-seat. The valve 59 slides within the cup 56, being confined therein and its motion limited by the cap 60 and normally held down by a spring 61. A heavier spring 62 is interposed between the cap 54 and the flange of the cup 56 and acts in opposition to the pressure exerted on the diaphragm. Normally the escape would be closed by the spring 61; but as this closing should only be effected when the thermostat has opened the valve sufficiently to admit the requisite pressure to close the main valve the escape is maintained open, so as to allow air to escape through passages 51 and 58 and openings 63 and 64. For this purpose a drag is employed which consists of a slotted tube 65, which has a threaded stem passing through an aperture in cap 54, and a nut is applied to the stem. The slotted body 65 is snugly fitted into the valve and tends by friction to hold the valve above its seat. When a sufficient air-pressure is secured by the further opening of the valve 41, the diaphragm 53 is flexed, carrying the valve-seat up against the valve and closing the escape. The escape being thus closed, the pressure will accumulate rapidly in the diaphragm-chamber of the main motor, thus closing the main valve. The pressure also operates on the diaphragm of the second motor controlling the escape, lifting the diaphragm of the escape-controlling motor, overcoming the friction of the drag and the tension of the large spring and raising the diaphragm 53 until the cap 60 comes in contact with the cap 54. The action upon the diaphragm of the second motor is not completed until after the main valve has been firmly seated, thus storing sufficient power in the spring 62 to secure the opening of the escape on the return movement before the pressure in the main motor is released sufficiently to permit the main valve to open again. When the temperature of the apartment falls, the expansible chamber or thermostat-disk contracts, the air-controlling valve 41 is closed, and the air in the system wastes through the permanent escape 47 until the pressure is reduced, so that the spring 62 will begin to return the diaphragm 53, the friction of the drag upon the valve restraining the latter sufficiently to again open the escape, whereupon the air escapes rapidly and permits the main valve to open quickly and fully. Adjustment for different temperatures is secured by operating the adjusting screw-plug 42, which moves the expansible chamber 19 bodily. Thus if the plug be turned so as to move the chamber away from the end of lever 30 it will require a higher temperature to cause sufficient expansion to secure a movement of the lever, while if the plug be turned in the opposite direction the spring 24 will move the vessel toward the end of lever 30 and a lower temperature will cause expansion adequate to secure the movement of the lever and the opening of the valve.

The form of thermostat shown in Figs. 7, 8, and 9 is, as before stated, particularly designed to be used in handling dampers or valves where a more gradual action is desirable. In this construction, therefore, the controllable escape and its motor (shown in Fig. 2) are omitted and a diaphragm is used which resists or acts in opposition to the expansible chamber or thermostat-disk. This diaphragm (marked 66) is secured at its edges to an annular plate 67 on the side of the pipe 15, the pipe being open at 15ᵃ to admit the air-pressure to act upon the inner side of the diaphragm. The center of the diaphragm is opposite the end of the lever 30 and is in close proximity and when operating in contact with the end of the lever. Now when the thermostat expands sufficiently to rock the lever 30 and open the valve 41 slightly the air will flow into the pipe 15; but in this case the passage 13 is connected to the reservoir and the passage 14 to the motor reversely to the connection described with reference to Fig. 2. Air entering the pipe 15 will now exert a pressure upon the diaphragm 66, and consequently tend to retard the movement of the lever 30, due to the expansion of the disk, and if the pressure of the air admitted preponderates over the power of the disk the valve 41 will return to its seat, thus permitting no more air to enter the pipe and the pressures remain in equilibrium so long as the temperature remains stationary. If, however, the temperature continues to rise, additional force will be exerted by the expansion of the volatile-liquid chamber, the lever will be rocked, and the valve again opened, thus permitting air to enter the pipe 15 until the power exerted upon the diaphragm 66 again balances the expansive force of the liquid in the chamber. Thus the air which passes through the valve to the motor will exert a more gradual action upon the motor controlling the valve or damper and adapting the improved thermostat to a wider range of uses, including the handling of hot-air dampers, valves in hot-water heating systems, and also in steam-heating systems, where the water of condensation is returned through separate pipes. It will be observed, however, that the structural features of the body of the thermostat and its operating parts, particularly of the bent lever, the valve, and expansible chamber for moving the bent lever are the same in both forms of construction, the modifications being designed to secure a more or less prompt action of the valves in different classes of work. Upon a fall of temperature the expansible chamber again contracts and the excess of pressure escapes through the permanent waste 47, permitting the damper to gradually open.

Having thus described my invention and without intending to limit the same to precise details of construction or arrangement of parts or the use of all of my improvements to precise object for which they are herein applied, I claim—

1. In a temperature-controlling apparatus, the combination with a thermostat for controlling a motor-fluid inlet, of a main valve for controlling the heat-supply and a motor for operating said valve, means for allowing a gradual waste or depletion of the motor fluid, and a supplemental waste between the main-valve motor and the motor-fluid inlet, a valve controlling the supplemental waste and a second motor independent of the main-valve motor for controlling the supplemental-waste valve, substantially as described.

2. In a temperature-controlling apparatus, the combination with a thermostat for controlling a motor-fluid inlet, a main valve governing the heat-supply, a motor for operating said main valve, an escape-valve between the main-valve motor and the motor-fluid inlet, and a second motor independent of the main-valve motor for controlling the escape-valve, said motor being adapted by its initial movement to actuate said escape-valve, substantially as described.

3. In a temperature-controlling apparatus, the combination with a pressure-fluid supply, a valve controlling said supply, a thermostat for controlling said valve, a main valve governing the heat-supply, a motor for controlling said main valve, an escape-valve between the fluid-supply inlet and the main-valve motor and a second motor independent of the main-valve motor and accessible to the motor fluid between the inlet and the main-valve motor and actuated thereby to control the escape-valve, substantially as described.

4. In a temperature-controlling apparatus, the combination with a valve for controlling a motor-fluid supply, of a thermostat for operating said valve, and a support for said thermostat, said support comprising an arm or lever pivotally mounted and adapted to oscillate or rock upon its pivot and having a resilient or elastic portion having a bearing at its extremity, and means for rocking the support upon its axis and thereby moving the thermostat bodily in relation to the valve, substantially as described.

5. A thermostat having a base portion, a tubular member parallel thereto, a pivoted lever having a resilient portion, an expansible chamber mounted upon said lever and bodily movable therewith, and a bent lever having one arm thereof arranged adjacent to the wall of the expansible chamber and the other entering said tubular member and adapted to operate a valve therein, substantially as described.

6. In a thermostat, the combination, with an expansible chamber consisting of a vessel of flat oval form having expansible walls, and a reinforcing frame or holder therefor consisting of clamp members constructed of elastic material and clips adapted to embrace the edges of the vessel and engage the extremities of the clamps, substantially as described.

7. In a thermostat, the combination, with an expansible chamber, of a pressure-fluid-supply passage, a valve therein, a lever having one end arranged in proximity to the movable wall of said expansible chamber and its opposite end arranged within said passage and adapted to actuate said valve, said lever being pivoted between its ends and a flexible packing adapted to form an air-tight joint near the pivot of said lever, substantially as described.

8. In a thermostat, the combination, with an expansible chamber, of a pressure-fluid-supply passage, a valve therein, a lever having one end arranged in proximity to the movable wall of said expansible chamber and its opposite end arranged within said passage and adapted to actuate said valve, said lever being pivoted between its ends and a flexible packing adapted to form an air-tight joint near the pivot of said lever and between said pivot and the valve, substantially as described.

9. In a thermostat, the combination, with an expansible chamber having a movable wall, a pressure-fluid-supply pipe or passage, a valve adapted to control said passage, means for actuating the valve, said means comprising a lever pivoted between its ends, one end of said lever being adapted to be operated by the movable wall of said expansible chamber and the other end being adapted to operate said valve, and a tubular packing applied to said lever and having a clamping-flange and adapted to form an air-tight joint in proximity to the pivot of the lever, substantially as described.

10. In a valve, the combination, with a tubular member having open ends and affording a passage for a pressure fluid and a valve-seat, of a valve-support consisting of a plate adapted to enter the bore of said tubular member, the latter having grooves therein to receive said plate and a flexible strip secured at one end to said plate and carrying a valve upon its free end, substantially as described.

11. A thermostatic device for controlling the passage of a motor fluid, comprising a chamber with suitable ports or passages for the motor fluid, a valve within said chamber, an expansible chamber or motor for operating the valve, a lever pivoted between its ends and having one of its ends arranged adjacent to the movable wall of the expansible chamber or motor and adapted to be moved thereby, and the other end thereof extending into said valve-chamber and adapted to operate the valve thereof and a diaphragm arranged to bear upon the lever in opposition to the disk and exposed to the pressure of the motor fluid passing the valve, substantially as described.

WILLIAM P. POWERS.

Witnesses:
FREDERICK C. GOODWIN,
IRVINE MILLER.